United States Patent [19]

Simpson

[11] Patent Number: 4,524,554
[45] Date of Patent: Jun. 25, 1985

[54] STRUCTURAL BRACING SYSTEM

[75] Inventor: Harold G. Simpson, Oklahoma City, Okla.

[73] Assignee: Encon Products, Inc., Oklahoma City, Okla.

[21] Appl. No.: 306,662

[22] Filed: Sep. 29, 1981

Related U.S. Application Data

[63] Continuation-in-part of Ser. No. 93,173, Nov. 3, 1979, Pat. No. 4,329,823.

[51] Int. Cl.³ .............................................. E04C 3/02
[52] U.S. Cl. ...................................... 52/693; 52/647; 52/655
[58] Field of Search ................. 52/647, 655, 690, 654, 52/693, 478, 696, 90

[56] References Cited

U.S. PATENT DOCUMENTS

| | | | |
|---|---|---|---|
| 1,458,498 | 6/1923 | Piel | 52/693 X |
| 2,027,882 | 1/1936 | Ross | 52/693 X |
| 2,964,807 | 12/1960 | Kennedy | 52/693 X |
| 3,332,196 | 7/1967 | Tuttle | 52/696 X |
| 3,380,209 | 4/1968 | Cheskin | 52/655 X |
| 3,969,863 | 7/1976 | Alderman | 52/478 X |
| 4,015,396 | 4/1977 | Butts et al. | 52/690 |
| 4,157,002 | 6/1979 | Adolph | 52/693 X |
| 4,345,409 | 8/1982 | Schroeder et al. | 52/693 |
| 4,408,423 | 10/1983 | Lautensleger et al. | 52/90 |

Primary Examiner—Carl D. Friedman
Attorney, Agent, or Firm—Bill D. McCarthy

[57] ABSTRACT

A building structure including a primary structure, secondary structural members supported on the primary structure, diagonal bracing means connected to and extending obliquely from the primary structure and the secondary structural members to increase the load carrying capacity of the secondary structural members. Bracing means also extend between secondary structural members.

17 Claims, 9 Drawing Figures

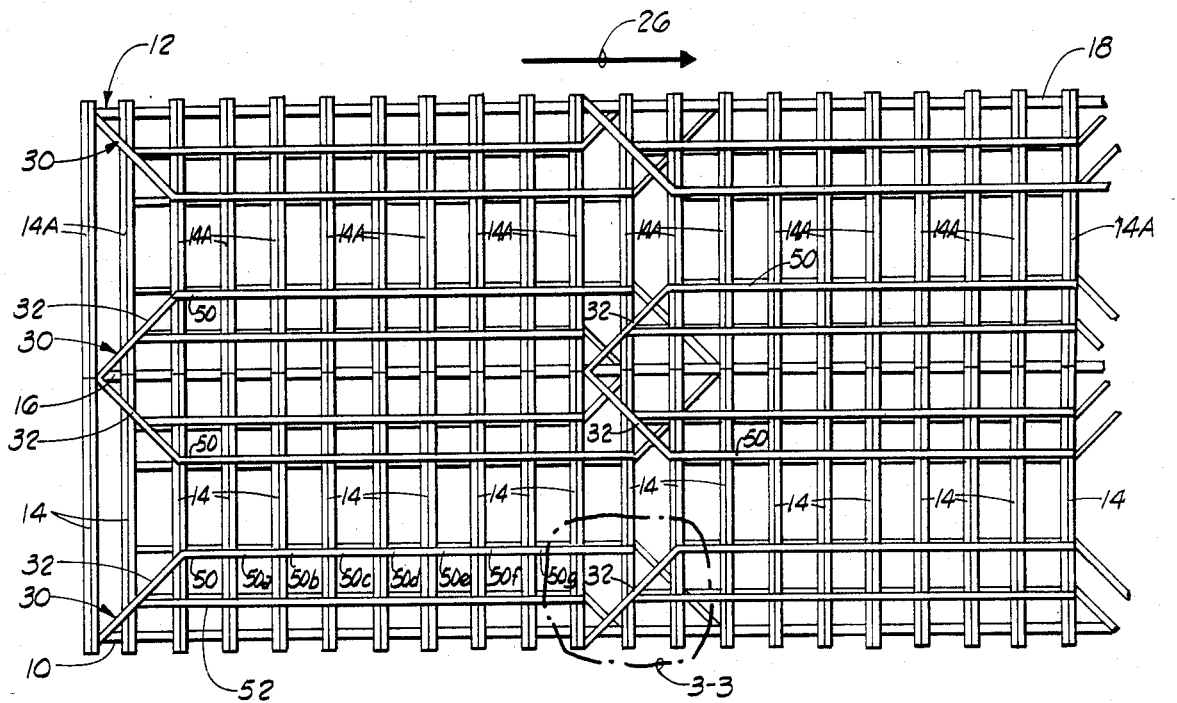
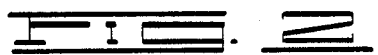
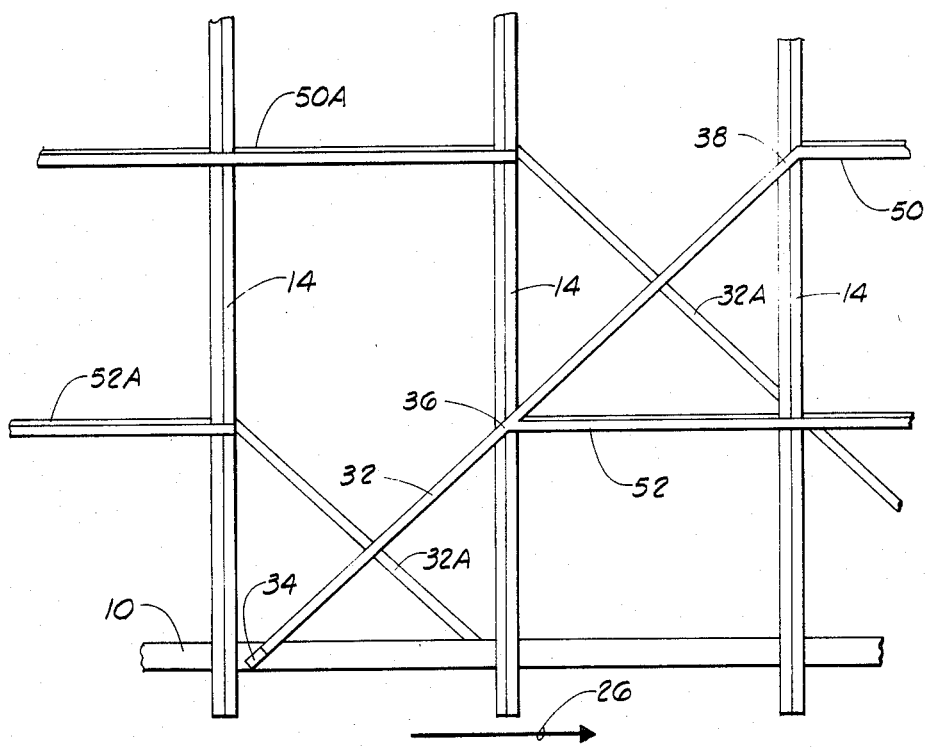
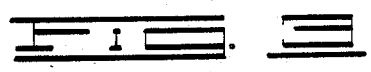

STRUCTURAL BRACING SYSTEM

This application is a continuation-in-part of my copending application Ser. No. 093,173, filed Nov. 3, 1979, now U.S. Pat. No. 4,329,823.

BACKGROUND OF THE INVENTION

The present invention relates to building assemblies having purlin type secondary structural members supported by underlying primary structural members, and more particularly, but not by way of limitation, to bracing apparatus and methods for stabilizing such secondary structural members to minimize or prevent compressive stress failures.

Purlins are generally relatively long Z-shaped or C-shaped members that are bolted to extend across metal roof beams that form part of the primary structure of a metal building, such building frequently referred to as a pre-engineered building. A roof assembly is constructed over the purlins and most frequently consists of layered insulation battings and roofing panels attached to the tops of the purlins.

It is well known that a metal panel roof supported by underlying purlins must transfer load to the primary building structure through the purlins. This load will be both from live loads (ambient elements of nature, repairmen, temporarily stored roofing materials, etc.) and from dead loads (permanently installed air conditioners, etc.).

It is in particular the live load conditions which alternately place building purlins in tensional and compressive stress. While attempts have been made by prior art teachings to strengthen a purlin system with bracing, none have been as totally compensatory for both purlin tensional and compressive stressing as presented by the present invention.

SUMMARY OF THE INVENTION

Briefly described, the present invention comprises an improved bracing system for a building system having a primary structure on which are supported secondary structural systems such as purlins, a first secondary structural member thereof supported at each of its ends by the primary structure, and a bracing system which interconnects to and extends between a portion of the first secondary structural member and the primary structure so that the first secondary structural member is restricted from translational movement and from rotational movement as the first secondary structural member is subjected to load.

Accordingly, an object of the present invention is to provide an improved structural bracing system in which load transfer straps are used effectively to stabilize structural members such as purlins from translational and rotational movement under load transference conditions.

Another object of the present invention, while achieving the above stated object, is to provide an improved structural bracing system which is easily installed and is cost effective.

Other objects, features and advantages of the present invention will become apparent upon reading the following specification in conjunction with the accompanying drawing and appded claims.

BRIEF DESCRIPTION OF THE DRAWINGS

FIG. 2 is a top plan view of a purlin secondary structural system supported by rafters and stabilized by bracing in accordance with the present invention.

FIG. 3 is an enlarged view of a portion of the system shown in FIG. 2, said portion designated View 3—3 in FIG. 2.

DESCRIPTION

The construction of a pre-engineered or metal building involves the establishment of a load bearing foundation, the erection of a primary structural system on the foundation which normally defines the building enclosure, the attachment of a secondary structural system to the primary structural system, and the attachment of an enclosure system, usually a wall and roof panel facade, to the secondary structural system to form a building envelope to enclose the interior building space.

Figure 1:
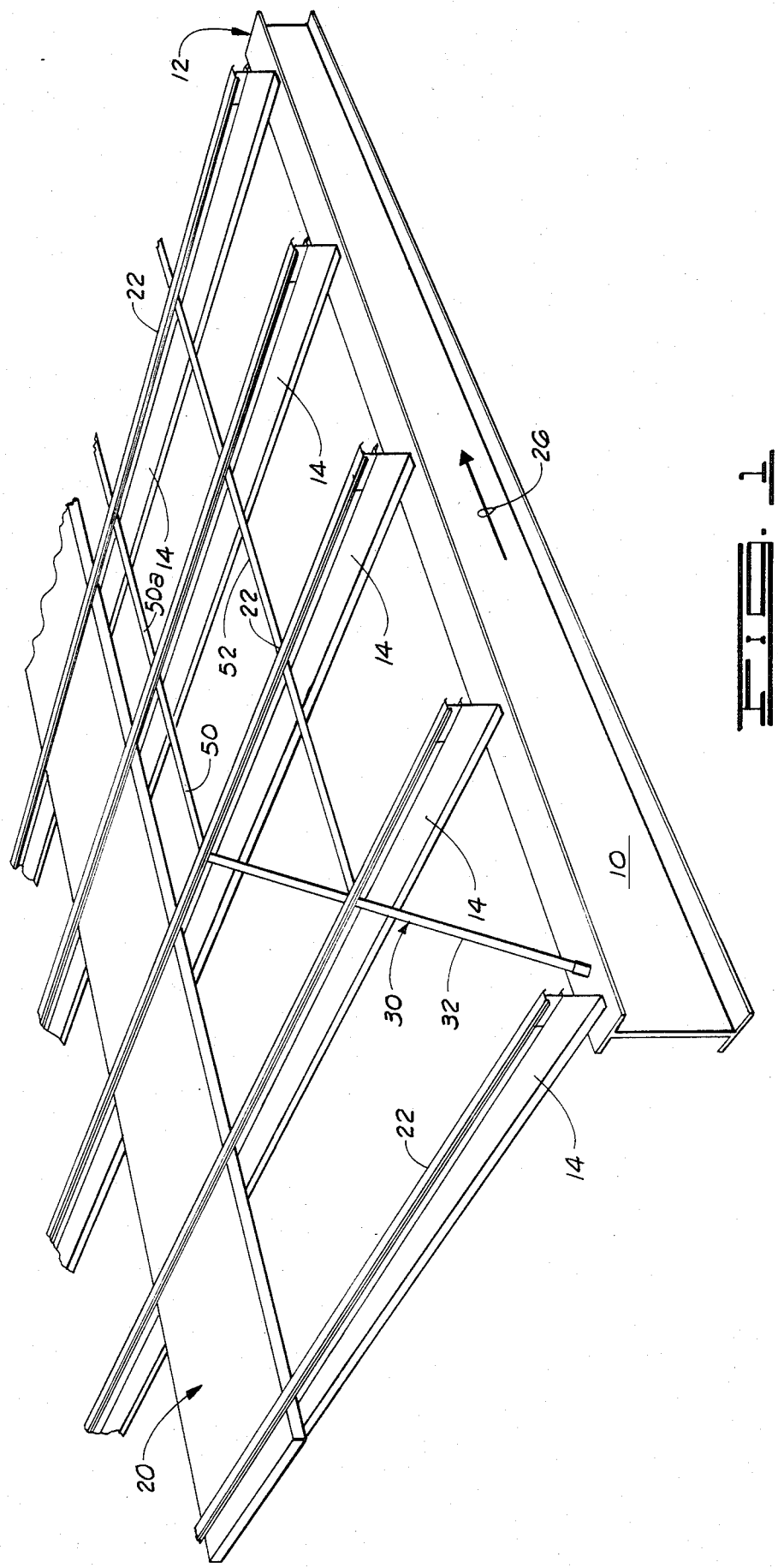
FIG. 1 is a perspective view in semi-schematical detail representation of a portion of a building roofing system in which several purlins are supported at one end by a rafter, a single batting of insulation is depicted over a portion of the purlins, and a structural bracing system is provided in accordance with the present invention.

Representative portions of such a building are depicted in FIG. 1 in which a primary structural member or an I-beam rafter 10 of a primary structural system 12 is shown with one end of each of a plurality of substantially parallel secondary structural members 14 supported thereon. The secondary structural members 14 will also be referred to herein as purlins, and while the presently described embodiment will involve Z-shaped purlins (the cross-section generally has the shape of a "Z"), the present invention is also applicable to other purlins, such as C-shaped purlins.

As shown in FIG. 2, each secondary structural member 14 is supported at its opposite end by another I-beam rafter 16 which is substantially parallel to the primary structural member 10. Each of the I-beam rafters 10, 16 is a primary structural member and the distance between these spaced apart members is referred to as a bay. It will be understood that the primary structural members 10, 16 are supported by other portions of the primary structural system 12, such as vertically extending column members (not shown), which are in turn supported by a foundation pad (also not shown).

The secondary structural system depicted in FIG. 2 shows the secondary structural members 14 spanning a single bay; that is, the secondary structural members 14 are supported at the ends thereof by the primary structural members 10, 16, and intermediate portions of the secondary structural members 14 over laying the opening between these primary structural members. In such case, other identical secondary structural members 14A are disposed in longitudinal alignment with, and interconnected to, respective secondary structural members 14 via appropriate bolting so as to extend across other bays, such as created by the spaced apart and substantially parallel third I-beam rafter or primary structural member 18 shown in FIG. 2. It will be appreciated that multiple bay span secondary structural members are known and the present invention is not limited by the bay spanning capacity of the secondary structural members.

Also shown in FIG. 1 is a single insulation batting 20 which is depicted as a layer which extends normally across the tops of the purlins 14. While a single insulation batting 20 is shown, it will be understood that in actual construction multiple battings are disposed in juxtaposition to form a continuous layer over the purlins. The roof panels (not shown) may be attached directly to the purlins in conventional fashion, or a plurality of support spacer apparatuses 22 may be provided in order to attach the panels to the underlying purlins while minimizing the disturbance to the insulation thickness. The support spacer apparatuses 22 embody my invention described in U.S. patent application Ser. No. 093,173, filed Nov. 3, 1979, now U.S. Pat. No. 4,329,823. The disclosure contained in that application is incorporated herein by reference and will be considered as though in fact described fully herein.

The present invention addresses the problem of transferring load from loading conditions that are placed on the building assembly depicted and described with reference to FIGS. 1 and 2. Such loads, as indicated above, can occur from live loads, which are transient or changing loads caused by nature (such as snow, wind, rain) and from the presence of temporary loads such as caused by a repairman and his temporarily stacked materials. Other loads are sometimes referred to as dead loads, which are those loads which occur from permanently supported articles, such as roof mounted air conditioners. Live loads will cause either an inwardly directed force or an outwardly directed force on the exterior envelope of a building, and it is known that these imposed loads will vary in time and magnitude as they are applied to the roof and wall facade and the loads are transferred to the purlins. The principles of stress loading discussed briefly herein are discussed in more detail elsewhere, such as in the "Specification for the Design of Cold-Formed Steel Structural Members," *American Iron and Steel Institute*, Sept. 3, 1980; also, "Commentary on the 1968 Edition of the Specification for the Design of Cold-Formed Steel Structural Members,"0 *American Iron and Steel Institute*, 7th Printing March 1977. See also the article entitled "What Makes A Metal Building System" by Duane S. Ellifritt, an article that appeared in the *Metal Building Review* magazine dated August, 1981. Publications such as this discuss these principles in a general manner, and provide some understanding as to paths of load transference through purlins. Prior art building systems have dealt with bracing secondary structural members in a variety of manners to increase the capability of purlins to endure the loading imposed thereon, but none of the prior art systems have satisfactorily dealt with the problem for all loading conditions.

Returning now to FIG. 1, shown therein is the improved bracing system 30 constructed in accordance with the present invention. FIG. 1 is a perspective view in semi-schematical detail representation of a portion of a building roofing system, and for purpose of this discussion, it will be determined that the arrow designated 26 indicates the upslope direction of the roofing system. The bracing system 30 comprises a series of diagonal braces 32 which are tensile straps connected to the primary structural members, such as the primary structural member 10, at one end thereof and extend obliquely from the primary structural members to connect to one or more of the purlins 14 at intermediate portions thereof. (As used herein, the term oblique will mean that the diagonal braces 32 extend from the primary structural members at an angle that is not perpendicular.) While this pattern is repeated at several areas of the building roofing system shown in FIG. 2, FIG. 1 shows only one of the diagonal braces 32 and the other bracing connected thereto which will be further described hereinbelow. An enlarged area designated View 3—3 of FIG. 2 is depicted in FIG. 3. The diagonal brace 32 is attached to the primary structural member 10 at the juncture point 34, to the first one of the adjacent purlins 14 at the juncture point 36, and to the second one of the next adjacent purlin 14 at juncture point 38.

Figure 4:
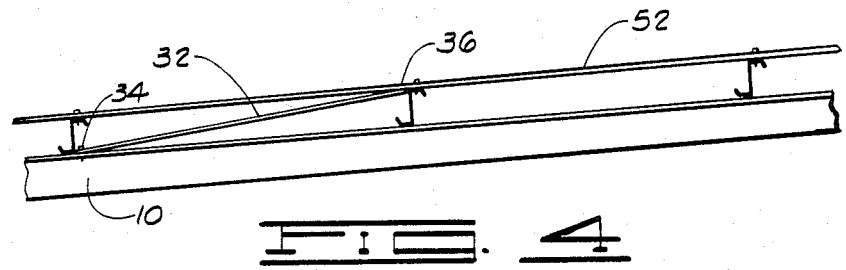
FIG. 4 is a side elevational view in semi-schematical detail of a portion of the system shown in FIG. 2.
Figures 5, 6:
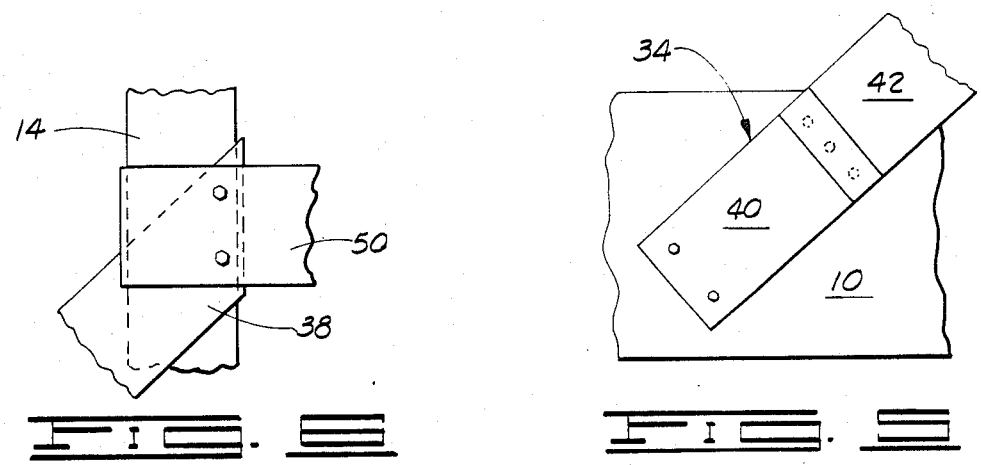
FIG. 5 is a top plan view of a strap end attachment to a rafter.
FIG. 6 is a top plan view of an intersection of a lateral bracing strap and an angled bracing strap at an underlying purlin.

FIG. 4 shows a side view representation of the diagonal brace 32 as it extends obliquely from the primary structural member 10 from the juncture point 34. FIG. 5 is an enlarged view of the juncture point 34, and may comprise an attachment pad 40 bolted to the primary structural member 10 and a span portion 42 which extends between the primary structural members and the secondary structural members 14.

FIG. 6 is a top view of the juncture point 38. As will become clear below, the diagonal bracing members 32 attach to and extend obliquely from the primary structural members and connect to the intermediate portions of the secondary structural 14. The purpose of these diagonal bracing members is to increase the load carrying capacity of the secondary structural members 14 by restricting the translation and rotation of the secondary structural members 14. This is accomplished by causing load to occur in the diagonal braces 32. While the presently described embodiments will discuss the invention with the use of preferred tensile loaded transfer bracing, it will be appreciated that compressive loaded transfer bracing can also be utilized.

The bracing system 30 also comprises a series of parallel straps which laterally stabilize others of the secondary structural members and which attach to the diagonal bracing straps 32 in such a manner that load transference is carried therethrough. A first one of the parallel straps 50 is attached to the purlin 14 at juncture point 38 as shown in FIGS. 3 and 5, and extends substantially parallel to the primary structural members and substantially perpendicularly to the secondary structural members. Additional portions of the parallel strap 50 extend in like manner over adjacent purlins 14 and boltingly attached to each purlin 14 over which they pass. For identification purposes, these additional portions of the parallel strap 50 are designated 50a through 50g in FIG. 2. Each diagonal brace 32 can be attached to one or more parallel straps 50. In the presently described embodiment, a parallel strap 52 is attached to the purlin 14 at juncture point 36 as shown in FIGS. 2 and 3, and extends substantially parallel to the primary structural member 10 and substantially perpendicular to the secondary structural members 14. In the manner described for the parallel strap 50, additional portions of the parallel strap 52 extend over adjacent purlins 14 and boltingly attach to each purlin 14 over which the strap 52 passes.

Figure 7:
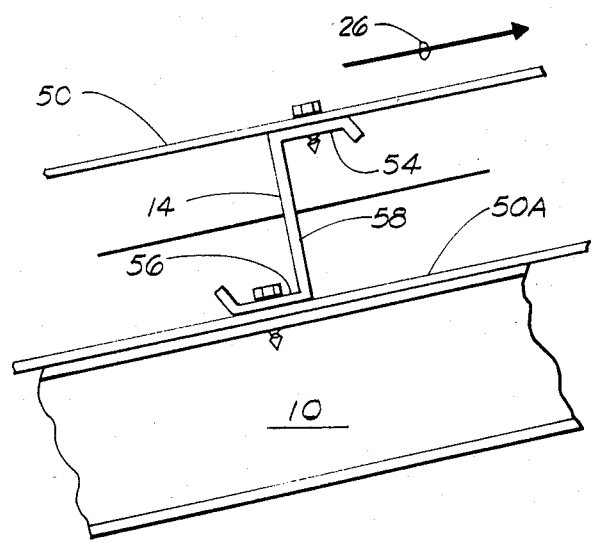
FIG. 7 is a side elevational, cross-sectional view of a purlin supported by a rafter and braced at its top flange and bottom flange in accordance with the present invention.

FIG. 7 is a side cross-sectional view of a purlin 14 supported by the primary structural member 10. The purlin 14 comprises an upper flange 54 and lower flange 56 which are substantially parallel to each other and which are interconnected by a flat web portion 58. The upper and lower flanges 54, 56 are asymmetrical to the web 58; that is, the flanges are not symmetrical to the plane of the web portion 58. A downwardly directed load on the purlin 14 will have vector components which will attempt to rotate and translate the purlin member 14 in a known manner. For such inwardly directed loads, the upper flange 54 will be placed in compression. Similarly, an outwardly directed load, such as caused by wind load, will stress the purlin 14 such as to place the lower flange 56 in compression. The placement of the bracing system 30 as hereinabove decribed will serve to stabilize the purlins 14 for an inwardly directed load. In order to provide bracing for an outwardly directed load, the bracing system 30 will be place substantially as follows.

The bracing system 30 also comprises a series of parallel straps which pass under the purlins and connect to diagonal braces 32A as shown in FIGS. 2 and 3. Also, a series of parallel straps 50A and 52A are attached to the purlins at the juncture points of the diagonal braces 32A and extend substantially parallel to the primary structural members and substantially perpendicularly to the secondary structural members. Additional portions of these parallel straps extend in like manner under adjacent purlins and boltingly attach to each purlin under which they pass. Each diagonal brace 32A can be attached to one or more parallel straps in the manner described above for the parallel straps 50 and 52. The juncture point connections to the purlins 14 can be the same as described above with relation to FIGS. 5 and 6.

Figure 8:
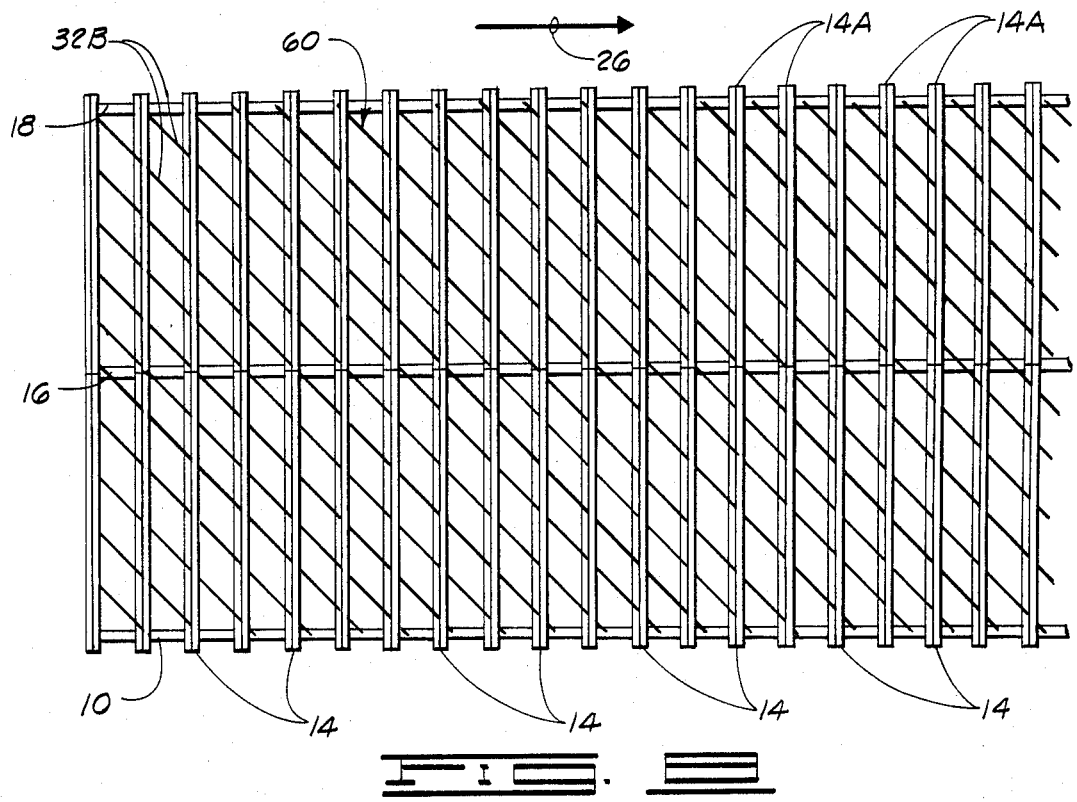
FIG. 8 is a top plan view of another purlin bracing system of the present invention.
Figure 9:
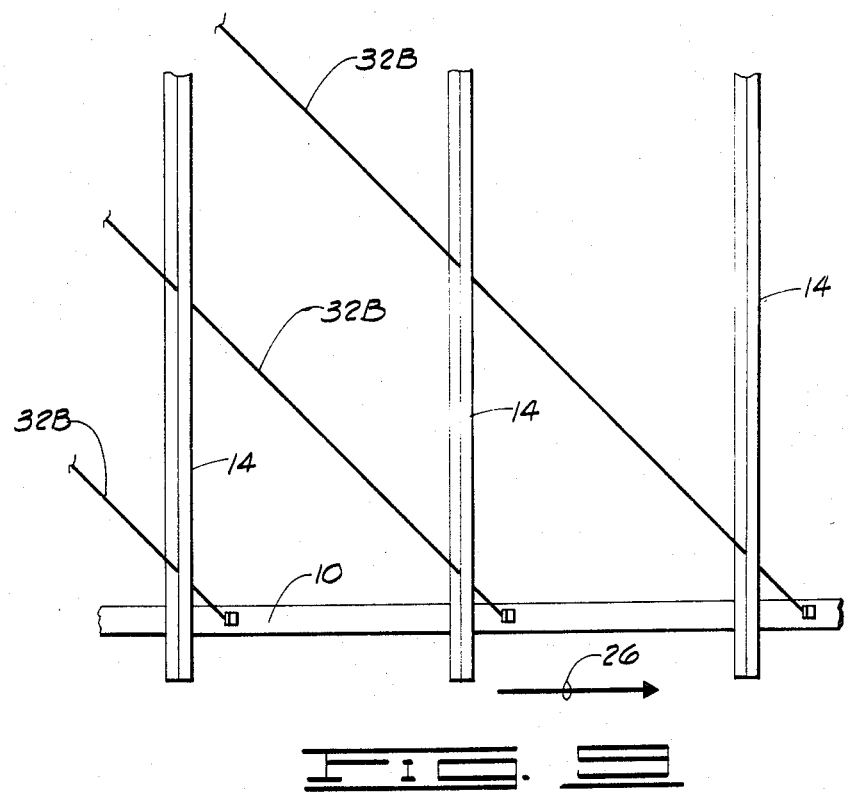
FIG. 9 is an enlarged view of a portion of the bracing system shown in FIG. 8.

The above described diagonal braces and parallel straps serve to restrict the purlins from translation and rotation of the compression elements of the secondary structural members. The diagonal braces serve to transfer the load from their connected purlins to the diagonal braces, and the exact patterns of the diagonal braces and parallel straps are not limiting in the present invention. For example, FIG. 8 shows a top plan view of another purlin bracing system 60 which is constructed in accordance with the present invention In this embodiment, a series of wire diagonal braces 32B extend obliquely from the primary structural members 10, 16, 18 and pass through appropriately located apertures (not shown) spatially disposed at intervals in the flat web portions of the purlins 14, 14A and interconnect the purlins for restricting the translation and rotation of the compression elements of these secondary structural members. The wire diagonal braces 32B attach to the purlins such as by welding or pressure device and serve to stabilize the purlins in accordance with the present invention. FIG. 9 is an enlarged view of a portion of the bracing system 60 shown in FIG. 8, and more clearly shows the wire diagonal braces 32B passing through the purlins 14 and attached to the primary structural member 10.

It is clear that the present invention is well adapted to carry out the objects and attain the ends and advantages mentioned as well as those inherent therein. While a presently preferred embodiment of the invention has been described for purposes of this disclosure, numerous changes may be made which will readily suggest themselves to those skilled in the art and which are encompassed within the spirit of the invention disclosed and as defined in the following claims.

What is claimed is:

1. A building assembly comprising:
    a primary structure;
    a first secondary structural member, having a first end and a second end, the first secondary structural member supported at its first and second ends by the primary structure; diagonal bracing means, connected to and extending obliquely from the primary structure and the first secondary structural member, for increasing the load carrying capacity of the first secondary structural member by substantially restricting the horizontal translation and the rotation of the first secondary structural member;
    a second secondary structural member having a first end and a second end, the second secondary structural member supported at its first and second ends by the primary structure and extending substantially parallel to the first secondary structural member; and
    first parallel bracing means for laterally stablilizing the second secondary structural member, the first parallel bracing means connected to the first secondary structural member and to the second secondary structural member, the first parallel bracing means attached to the first secondary structural member adjacent the point of attachment of the diagonal bracing means thereto.

2. The building assembly of claim 1 further comprising:
    a third secondary structural member having a first end and a second end, the third secondary structural member supported at its first and second ends by the primary structure and extending substantially parallel to the first and second secondary structural members; and
    second parallel bracing means for laterally stabilizing the third secondary structural member, the second parallel bracing means connected to the second secondary structural member and to the third secondary structural member, the second parallel bracing means attached to the secondary structural member at the point of attachment of the first parallel bracing means thereto.

3. The building assembly of claim 1 in which the first and second secondary structural members are each characterized as purlins with each having an upper flange, a lower flange and a web extending therebetween and connecting the upper and lower flanges, the diagonal bracing means and first parallel bracing means characterized as stabilizing the first and secondary structural members.

4. The building assembly of claim 3 in which the upper flanges of the first and second secondary structural members are spatially disposed to extend from their respective webs in the same direction, and in which the diagonal bracing means is attached to a selected one of the upper and lower flanges of the first secondary structural member and in which the first parallel bracing means is attached to the same selected one of the upper and lower flanges of the second secondary structural member.

5. The building assembly of claim 4 in which the diagonal bracing means is attached to the lower flanges of the first secondary structural member for stabilizing the first and second secondary structural members with respect to upwardly directed load thereon.

6. The building assembly of claim 3 in which the diagonal bracing means is attached to the upper flange of the first secondary structural member for stabilizing the first and second secondary structural members with respect to downwardly directed load thereon.

7. The building assembly of claim 6 in which the diagonal bracing means and first parallel bracing means are each characterized as tensile load transferring straps.

8. A building assembly comprising:
a primary strucuture;
a first secondary structural member, having a first end and a second end, the first secondary structural member supported at its first and second ends by the primary structure; and
diagonal bracing means, connected to and extending obliquely from the primary structure and the first secondary structural member, for increasing the load carrying capacity of the first secondary structural member by substantially restricting the horizontal translation and the rotation of the first secondary structural member;
wherein the first secondary structural member is characterized as a purlin having an upper flange, a lower flange and a web extending therebetween and connecting the upper and lower flanges, the diagonal bracing means characterized as stabilizing the first secondary structural member; and
wherein the diagonal bracing means is characterized as having at least one diagonal brace connected to the upper flange and at least one other diagonal brace connected to the lower flange of the first secondary structural member, the diagonal braces connected to the primary structure.

9. A building assembly comprising:
a primary structure;
a plurality of substantially parallel and spaced apart secondary structural members supported at the ends thereof by the primary structure;
diagonal bracing means, connected to and extending obliquely from the primary structure and connected to at least one of the secondary structural members, for increasing the load carrying capacity of the connected secondary structural members by substantially restricting the horizontal translation and the rotation of the connected secondary structural members; and
parallel bracing means for laterally stabilizing the secondary structural members, the parallel bracing means connected to the diagonal bracing means and attached to at least one other of the secondary structural members.

10. The building assembly of claim 9 in which the secondary structural members are each characterized as a purlin having an upper flange, a lower flange and a web extending therebetween and connecting the upper and lower flanges, the diagonal bracing means characterized as stabilizing the purlins.

11. The building assembly of claim 9 in which the structural members are each characterized as being purlins with each having an upper flange, a lower flange and web extending therebetween and connecting the upper and lower flanges, the diagonal bracing means and parallel bracing means characterized as stabilizing the purlins.

12. The building assembly of claim 10 or 11 further comprising:
panel means supported on the upper flanges of the purlins for at least partially enclosing the building assembly.

13. The building assembly of claim 10 in which the diagonal bracing means and parallel bracing means are each characterized as comprising a plurality of tensile load transferring straps interconnecting the primary structure and the purlins.

14. The building assembly of claim 10 in which the diagonal bracing means extends through and connects to a plurality of the purlins.

15. The building assembly of claim 11 in which the upper flanges of the purlins are spatially disposed to extend from their respective webs in the same direction, and in which the diagonal bracing means and parallel bracing means are connected to the upper flanges of the purlins.

16. The building assembly of claim 15 in which the lower flanges of the purlins are spatially disposed to extend from their respective webs in the same direction, and in which other portions of the diagonal bracing means and parallel bracing means are connected to the lower flanges of the purlins.

17. In a building assembly having a plurality of secondary structural members supported at the ends thereof by, and disposed to extend generally perpendicularly to, primary structural members, an improved method of bracing the secondary structural members for increasing the load carrying capacity of the secondary structural members comprising:
connecting at least one of the secondary structural members to a primary structure member with a diagonal brace extending obliquely from the primary structure; and
connecting at least one other secondary structural member to the diagonal brace by at least one parallel brace connected to the other secondary structural member and to the diagonal brace.

* * * * *

UNITED STATES PATENT AND TRADEMARK OFFICE
CERTIFICATE OF CORRECTION

PATENT NO. : 4,524,554

DATED : June 25, 1985

INVENTOR(S) : Harold G. Simpson

It is certified that error appears in the above-identified patent and that said Letters Patent is hereby corrected as shown below:

```
     In column 1, line 68, the word "appeded" should read
--appended--.  In column 3, line 54, reading "bers,"0
American" should read --bers," American--.  In column 4,
line 37, reading "structural 14" should read --structural
members 14--.  In claim 1, column 6, line 10, reading as
follows:
     "the primary structure; diagonal bracing means,"
should read as follows:
   --the primary structure;
diagonal bracing means,--.
```

*Signed and Sealed this*

*Fourteenth* Day of *January 1986*

[SEAL]

*Attest:*

DONALD J. QUIGG

*Attesting Officer*     *Commissioner of Patents and Trademarks*